(12) United States Patent
Zhou et al.

(10) Patent No.: US 11,105,266 B2
(45) Date of Patent: Aug. 31, 2021

(54) SYSTEM FOR PROVIDING MOBILE POWER

(71) Applicant: YANTAI JEREH PETROLEUM EQUIPMENT & TECHNOLOGIES CO., LTD., Yantai (CN)

(72) Inventors: Libin Zhou, Yantai (CN); Qili Cui, Yantai (CN); Lili Wang, Yantai (CN); Ning Feng, Yantai (CN); Tao Kou, Yantai (CN); Ting Zhang, Yantai (CN); Tao Zhang, Yantai (CN); Xin Li, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 16/838,795

(22) Filed: Apr. 2, 2020

(65) Prior Publication Data
US 2021/0180517 A1    Jun. 17, 2021

(30) Foreign Application Priority Data
Dec. 17, 2019 (CN) .......................... 201911299129.6

(51) Int. Cl.
*F02C 7/20* (2006.01)
*E21B 43/16* (2006.01)
*F02C 7/32* (2006.01)

(52) U.S. Cl.
CPC ................ *F02C 7/20* (2013.01); *E21B 43/16* (2013.01); *F02C 7/32* (2013.01)

(58) Field of Classification Search
CPC .......... E21B 43/26; F01D 15/10; F01D 25/28; F05D 2230/60–68; F05B 2240/94; F05B 2240/941; F02C 7/20; F16M 3/00

USPC .......................................................... 290/1 A
See application file for complete search history.

(56) References Cited

U.S. PATENT DOCUMENTS

| | | | | |
|---|---|---|---|---|
| 5,517,822 A * | 5/1996 | Haws | .................... | F01K 17/025 60/618 |
| 6,765,304 B2 * | 7/2004 | Baten | ...................... | F02B 63/04 290/1 A |
| 6,786,051 B2 * | 9/2004 | Kristich | .................. | F01D 15/10 60/796 |
| 8,587,136 B2 * | 11/2013 | Williams | ................ | F01K 13/00 290/1 R |
| 9,534,473 B2 * | 1/2017 | Morris | .................... | F01D 25/30 |

(Continued)

FOREIGN PATENT DOCUMENTS

| CN | 201608528 U | 10/2010 |
|---|---|---|
| CN | 110159432 A | 8/2019 |

(Continued)

*Primary Examiner* — Gerald L Sung
*Assistant Examiner* — Rene D Ford
(74) *Attorney, Agent, or Firm* — Xsensus, LLP (57) ABSTRACT

The present invention discloses a system for providing mobile power, in which all equipment required for the mobile power are integrated on three transport vehicles, which can be combined for transport as a whole, greatly reducing the connection time required for field operations, with flexible combinations and wider applicability. An exhaust system can be flexibly connected to the side or the top. An air intake system, a gas turbine engine and a generator are connected at the same axial direction, avoiding unnecessary elbows, with small intake pressure losses and a stable flow direction.

15 Claims, 4 Drawing Sheets

(56) References Cited

U.S. PATENT DOCUMENTS

| | | | |
|---|---|---|---|
| 10,030,579 B2* | 7/2018 | Austin | F02B 63/044 |
| 10,060,349 B2* | 8/2018 | Morales Ivarez | F02C 7/20 |
| 10,184,397 B2* | 1/2019 | Austin | F02C 3/04 |
| 2006/0080971 A1* | 4/2006 | Smith | F01D 21/003 |
| | | | 60/797 |
| 2014/0219824 A1* | 8/2014 | Burnette | F04B 47/00 |
| | | | 417/53 |
| 2016/0248230 A1* | 8/2016 | Tawy | F01D 25/285 |
| 2016/0308419 A1* | 10/2016 | Sethi | F01D 25/28 |
| 2017/0321600 A1* | 11/2017 | Moniz | F02C 3/107 |
| 2019/0203572 A1 | 7/2019 | Morris et al. | |

FOREIGN PATENT DOCUMENTS

| | | |
|---|---|---|
| CN | 110159433 A | 8/2019 |
| CN | 110284972 A | 9/2019 |
| CN | 110374745 A | 10/2019 |
| CN | 110513155 A | 11/2019 |
| CN | 110848028 A | 2/2020 |

\* cited by examiner

SYSTEM FOR PROVIDING MOBILE POWER

TECHNICAL FIELD

The present invention relates to the technical field of fracturing, and specifically to a system for providing mobile power.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electric drive fracturing equipment will effectively reduce the discharge of environmental pollutants, the occupied area, noise and the operation and maintenance costs. With the use of a complete set of electric drive fracturing equipment and the continuous increase of the power of the electric drive fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites. Generally, because various parts of a power supply system require different assembly, transportation and installation methods, the installation time of the power supply system will be up to half to one month. While a highly integrated power supply system may in turn cause the oversize of transport vehicles, resulting in that it is hard for them to go on the road or they cannot go on the road at all due to the limitation of road rules and road carrying capacities.

Therefore, how to provide a mobile power supply system which can be installed quickly and conveniently and combined flexibly at the electric drive fracturing operation site is currently a great challenge for electric drive fracturing operations.

SUMMARY

To overcome the deficiencies in the prior art, an objective of the present invention is to provide a system for providing mobile power. The system includes three transport carriers, on which are integrated all the equipment required for the mobile power. An auxiliary system including a lubrication system, a fire fighting system and a fuel system, as well as a power control system are integrated on a gas turbine generation transport vehicle to reduce the number of transport carriers in the system itself, also save the cost of equipment, and reduce the connection time, especially the connection time of electrical wiring. An exhaust system, a lifting mechanism, an up-down adjusting device and a parallelogram mechanism are integrated on an exhaust transport vehicle to connect the exhaust system to the side or the top of the gas turbine generation transport vehicle. When connected to the top, the separation between the exhaust system and the exhaust transport vehicle is achieved by the opening-closing of a locking mechanism. That is to say, in this state, the exhaust system can be a part of the gas turbine generation transport vehicle, and can move with the gas turbine generation transport vehicle simultaneously. Especially in the case of short distance movement in the wellsite, this one-piece movement eliminates the disassembly and reconnection between the exhaust system and the gas turbine engine, meanwhile saves the moving cost and moving time of the transport carrier on which the exhaust system is disposed. An intake ventilation transport vehicle is connected in the travel direction of the gas turbine generation transport vehicle, so that the intake ventilation transport vehicle can be transported separately as a whole, or powered by a gas turbine generation transport vehicle to be transported. The two modes can be used flexibly to save the time for connection, especially in the wellsite, rapid movement into position could be achieved. Meanwhile, an air intake system, a gas turbine engine and a generator are arranged at the same axial direction, avoiding unnecessary elbows, with small intake pressure losses and a stable flow direction. Of course, the integral shipping of an intake ventilation transport vehicle and a gas turbine generation transport vehicle, or/and the integral shipping of an exhaust system and a gas turbine generation transport vehicle, are both possible if road transport conditions permit, not limited to the wellsite.

The objective of the present invention is achieved by the following technical measures: A system for providing mobile power, including a gas turbine generation transport vehicle, an intake ventilation transport vehicle and an exhaust transport vehicle, the intake ventilation transport vehicle is docked in the travel direction of the gas turbine generation transport vehicle, and the exhaust transport vehicle is disposed at one side of the gas turbine generation transport vehicle.

Further, the exhaust transport vehicle includes an exhaust system, the exhaust system is connected to the side or the top of the gas turbine generation transport vehicle.

Further, the system for providing mobile power further comprising a lifting mechanism, when the exhaust system is connected to the side of the gas turbine generation transport vehicle, and a side docking of the exhaust system is achieved by the lifting mechanism disposed on the exhaust transport vehicle.

Further, the system for providing mobile power further comprising a lifting mechanism, an up-down adjusting device, and a parallelogram mechanism, when the exhaust system is connected to the top of the gas turbine generation transport vehicle, the top docking of the exhaust system is achieved by the combined action of the lifting mechanism, the up-down adjusting device and the parallelogram mechanism disposed on the exhaust transport vehicle.

Further, the exhaust system is placed horizontally in transport state, while in working state, it is lifted by a lifting mechanism from horizontal to vertical.

Further, the exhaust system includes an exhaust silencer, an exhaust elbow, an exhaust reducer union and an exhaust expansion joint, the exhaust silencer is connected to the exhaust elbow, the exhaust elbow is hinged with the exhaust reducer union, the exhaust reducer union is connected to the exhaust expansion joint; while in working state, the exhaust reducer union and the exhaust expansion joint can rotate to each other through a hinge, enabling the exhaust reducer union docked with the exhaust elbow.

Further, when the exhaust system is connected to the top of the gas turbine generation transport vehicle, the exhaust system is separably connected to the exhaust transport vehicle.

Further, when the exhaust system is connected to the top of the gas turbine generation transport vehicle, the exhaust system is separably connected to the exhaust transport vehicle by separation from the parallelogram mechanism.

Further, a locking mechanism is disposed between the exhaust system and the parallelogram mechanism, the exhaust system is separated from the parallelogram mechanism through the opening-closing of the locking mechanism.

Further, the up-down adjusting device includes a first connecting plate, a first hydraulic cylinder and a second hydraulic cylinder, the first hydraulic cylinder is disposed between the first connecting plate and the lifting mechanism, the first hydraulic cylinder is used to adjust the first connecting plate up and down, one end of the second hydraulic cylinder is connected to the first connecting plate, the other end of the second hydraulic cylinder is connected to the parallelogram mechanism, and the horizontal displacement of the exhaust system is achieved by the expansion of the second hydraulic cylinder.

Further, the parallelogram mechanism includes four supporting edges which are hinged end to end to form a parallelogram.

Further, the intake ventilation transport vehicle is transported separately as a whole, or powered by the gas turbine generation transport vehicle to be transported after being docked with the gas turbine generation transport vehicle.

Further, the gas turbine generation transport vehicle includes a gas turbine engine, a generator, a power control system and a first transport carrier, the gas turbine engine, the generator and the power control system are integrated on the first transport carrier, and the gas turbine engine is connected to the generator.

Further, the power control system includes an electric power unit and a control system, the electric power unit is configured to output electric power from the generator, and the control system includes a gas turbine control unit and a generator control unit.

Further, the intake ventilation transport vehicle includes an air intake system, a cabin ventilation and cooling system and a second transport carrier, the air intake system and the cabin ventilation and cooling system are disposed on the second transport carrier, the air intake system is connected to an air intake port of the gas turbine engine, and the air intake system, the gas turbine engine and the generator are arranged at the same axial direction.

Further, the cabin ventilation and cooling system provides clean air for cooling the gas turbine engine.

Further, the gas turbine generation transport vehicle includes an auxiliary system which services the gas turbine engine and/or the generator.

Further, the auxiliary system includes a lubrication system, a fire fighting system and a fuel system, the lubrication system provides lubrication for the gas turbine engine and the generator, the fire fighting system is used for fire protection of the gas turbine generation transport vehicle, and the fuel system provides fuels for the gas turbine engine.

Compared with the prior art, the present invention has the following beneficial effects: providing a system for providing mobile power, the system includes three transport carriers, on which are integrated all the equipment required for the mobile power. An auxiliary system including a lubrication system, a fire fighting system and a fuel system, as well as a power control system are integrated on a gas turbine generation transport vehicle to reduce the number of transport carriers in the system itself, also save the cost of equipment, and reduce the connection time, especially the connection time of electrical wiring. An exhaust system, a lifting mechanism, an up-down adjusting device and a parallelogram mechanism are integrated on an exhaust transport vehicle to connect the exhaust system to the side or the top of the gas turbine generation transport vehicle. When connected to the top, the separation between the exhaust system and the exhaust transport vehicle is achieved through the opening-closing of a locking mechanism. That is to say, in this state, the exhaust system can be a part of the gas turbine generation transport vehicle, and can move with the gas turbine generation transport vehicle simultaneously. Especially in the case of short distance movement in the wellsite, this one-piece movement eliminates the disassembly and reconnection between the exhaust system and the gas turbine engine, meanwhile saves the moving cost and moving time of the transport carrier on which the exhaust system is disposed. An intake ventilation transport vehicle is connected in the travel direction of the gas turbine generation transport vehicle, so that the intake ventilation transport vehicle can be transported separately as a whole, or powered by a gas turbine generation transport vehicle to be transported. The two modes can be used flexibly to save the time for connection, especially in the wellsite, rapid movement into position could be achieved. Meanwhile, an air intake system, a gas turbine engine and a generator are arranged at the same axial direction, avoiding unnecessary elbows, with small intake pressure losses and a stable flow direction. Of course, the integral shipping of an intake ventilation transport vehicle and a gas turbine generation transport vehicle, or/and the integral shipping of an exhaust system and a gas turbine generation transport vehicle, are both possible if road transport conditions permit, not limited to the wellsite.

The present invention will be described in detail below with reference to the accompanying drawings and specific implementations.

Wherein, 100. gas turbine generation transport vehicle, 200. intake ventilation transport vehicle, 300. exhaust transport vehicle, 101. air intake port, 102. gas turbine engine, 103. generator, 104. power control system, 201. intake filter, 202. intake silencer, 203. ventilation filter, 204. ventilation silencer, 205. ventilation fan, 301. exhaust system, 302. the third hydraulic cylinder, 303. the second connecting plate, 304. the first connecting plate, 305. the first hydraulic cylinder, 306. the second hydraulic cylinder, 307. parallelogram mechanism, 308. locking hook, 309. locking bracket, 310. exhaust silencer, 311. exhaust elbow, 312. exhaust reducer union, 313. exhaust expansion joint.

DESCRIPTION OF THE EMBODIMENTS

As shown in FIGS. 1 to 8, a system for providing mobile power includes a gas turbine generation transport vehicle 100, an intake ventilation transport vehicle 200 and an exhaust transport vehicle 300, the intake ventilation transport vehicle 200 is docked in the travel direction of the gas turbine generation transport vehicle 100, the exhaust transport vehicle 300 is disposed at one side of the gas turbine generation transport vehicle 100.

Figure 1:
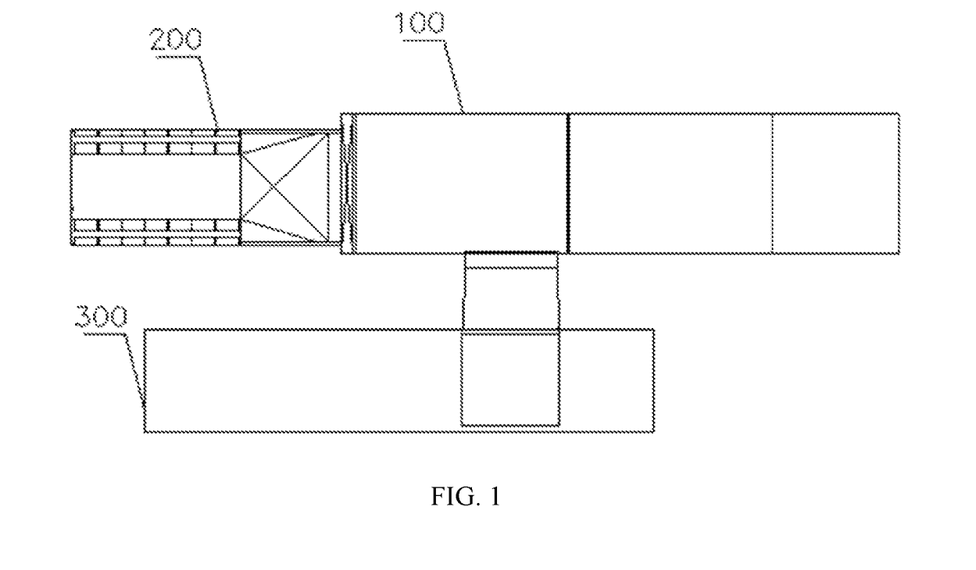
FIG. 1 is a schematic structural diagram of side connection of an exhaust system in the technical solution of the invention.
Figure 2:
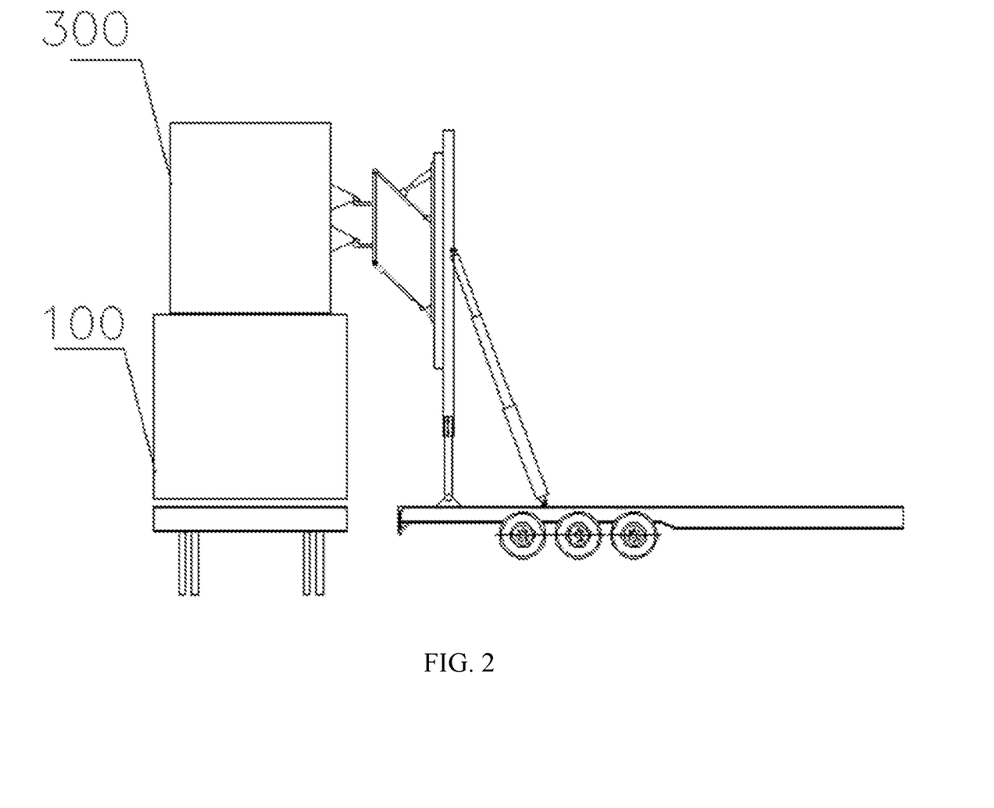
FIG. 2 is a schematic structural diagram of top connection of an exhaust system in the technical solution of the invention.

The exhaust transport vehicle 300 includes an exhaust system 301 which is connected to the side or the top of the gas turbine generation transport vehicle 100.

Optionally, the system for providing mobile power further comprises a lifting mechanism. When the exhaust system 301 is connected to the side of the gas turbine generation transport vehicle 100, the side docking of the exhaust system 301 is achieved by the lifting mechanism disposed on the exhaust transport vehicle 300. Optionally, the system for providing mobile power further comprises a lifting mechanism, an up-down adjusting device, and a parallelogram mechanism. When the exhaust system 301 is connected to the top of the gas turbine generation transport vehicle 100, the top docking of the exhaust system 301 is achieved by the combined action of the lifting mechanism, the up-down adjusting device and the parallelogram mechanism disposed on the exhaust transport vehicle 300, thus avoiding hoisting, reducing operational difficulty, and improving operation convenience.

The exhaust transport vehicle 300 further includes a third transport carrier, on which the exhaust system 301, the lifting mechanism, the up-down adjusting device and the parallelogram mechanism 307 are integrated. The lifting mechanism includes a third hydraulic cylinder 302 and a second connecting plate 303, one end of the third hydraulic cylinder 302 is connected to the second connecting plate 303, the other end of the third hydraulic cylinder 302 is connected to the third transport carrier. The second connecting plate 303 is rotated from horizontal to vertical through the expansion of the third hydraulic cylinder 302.

The exhaust system 301 is placed horizontally in transport state, while in working state, it is lifted by a lifting mechanism from horizontal to vertical.

The exhaust system 301 includes an exhaust silencer 310, an exhaust elbow 311, an exhaust reducer union 312 and an exhaust expansion joint 313, the exhaust silencer 310 is connected to the exhaust elbow 311, the exhaust elbow 311 is hinged with the exhaust reducer union 312, and the exhaust reducer union 312 is connected to the exhaust expansion joint 313; while in working state, the exhaust reducer union 312 and the exhaust expansion joint 313 can rotate to each other through a hinge, enabling the exhaust reducer union 312 docked with the exhaust elbow 311.

Figure 7:
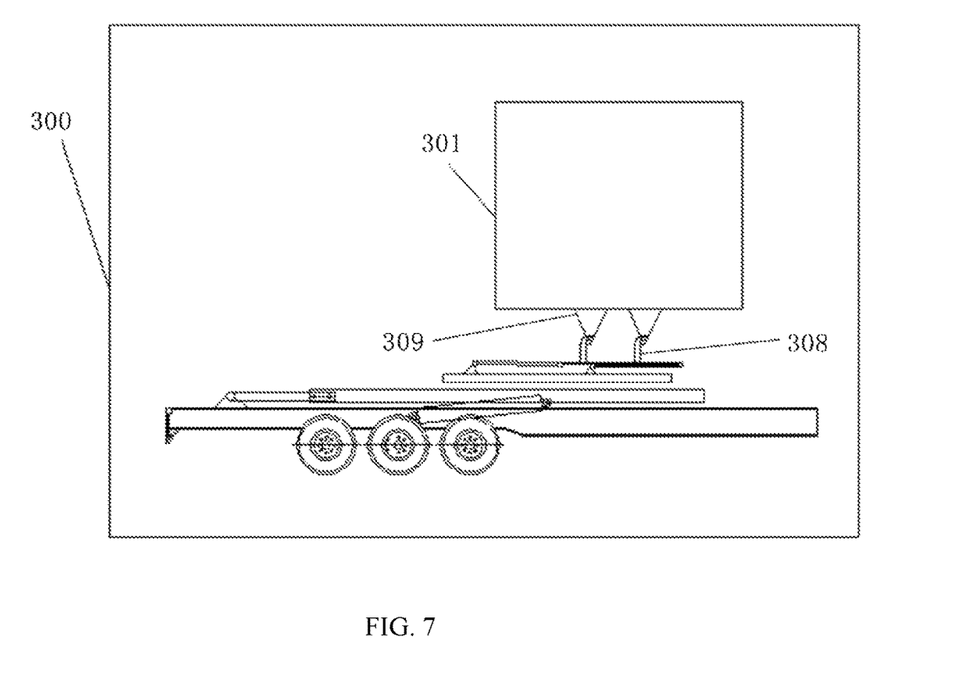
FIG. 7 is a schematic structural diagram of top connection of the exhaust transport vehicle in transport state.
Figure 8:
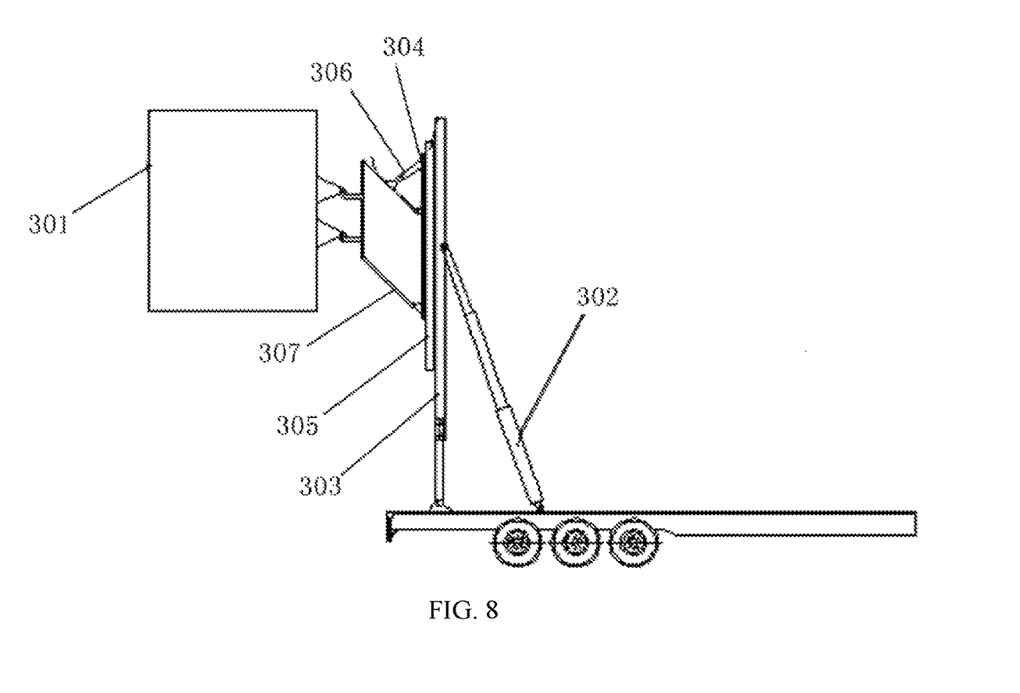
FIG. 8 is a schematic structural diagram of top connection of the exhaust transport vehicle in working state.

When the exhaust system 301 is connected to the top of the gas turbine generation transport vehicle 100, the exhaust system 301 is separably connected to the exhaust transport vehicle 300.

When the exhaust system 301 is connected to the top of the gas turbine generation transport vehicle 100, the exhaust system 301 is separably connected to the exhaust transport vehicle 300 by separation from the parallelogram mechanism 307. After separation, the exhaust system 301 can be a part of the gas turbine generation transport vehicle 100, and can move with the gas turbine generation transport vehicle 100 simultaneously. Especially in the case of short distance movement in the wellsite, this one-piece movement eliminates the disassembly and reconnection between the exhaust system 301 and the gas turbine engine 102, meanwhile saves the moving cost and moving time of the transport carrier on which the exhaust system 301 is disposed.

A locking mechanism is disposed between the exhaust system 301 and the parallelogram mechanism 307, the exhaust system 301 is separated from the parallelogram mechanism 307 through the opening-closing of the locking mechanism. The locking mechanism includes a locking bracket 309 connected with the exhaust system 301 and a locking hook 308 connected with the parallelogram mechanism 307. When separation is needed, the first connecting plate 304 is adjusted to move down through the expansion of the first hydraulic cylinder 305, the first connecting plate 304 drives the parallelogram mechanism 307 and the locking hook 308 to move down, therefore separating the locking hook 308 from the locking bracket 309.

The up-down adjusting device includes a first connecting plate 304, a first hydraulic cylinder 305 and a second hydraulic cylinder 306, the first hydraulic cylinder 305 is disposed between the first connecting plate 304 and the second connecting plate 303 of the lifting mechanism, the first hydraulic cylinder 305 is configured to adjust the first connecting plate 304 up and down, one end of the second hydraulic cylinder 306 is connected to the first connecting plate 304, the other end of the second hydraulic cylinder 306 is connected to the parallelogram mechanism 307, and the horizontal displacement of the exhaust system 301 is achieved by the expansion of the second hydraulic cylinder 306.

The parallelogram mechanism 307 includes four supporting edges which are hinged end to end to form a parallelogram. One end of the second hydraulic cylinder 306 is connected to one of the supporting edges. The second hydraulic cylinder 306 extends out to push the parallelogram to deform to a square or a rectangle, that is, the exhaust system 301 is pushed out in horizontal direction.

The intake ventilation transport vehicle 200 is transported separately as a whole, or powered by the gas turbine generation transport vehicle 100 to be transported after being docked with the gas turbine generation transport vehicle 100, thus being suitable for different road conditions, with flexible combinations and wider applicability.

Figure 3:
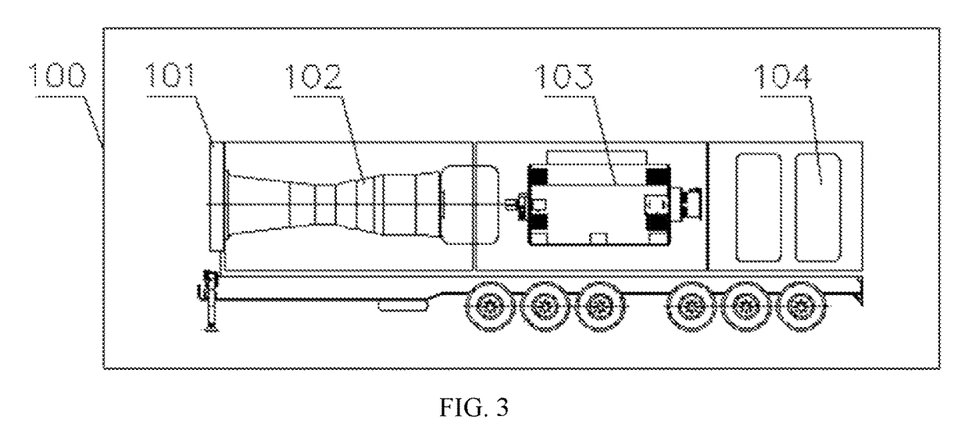
FIG. 3 is a schematic structural diagram of a gas turbine generation transport vehicle.

The gas turbine generation transport vehicle 100 includes a gas turbine engine 102, a generator 103, a power control system 104 and a first transport carrier, the gas turbine engine 102, the generator 103 and the power control system 104 are integrated on the first transport carrier, and the gas turbine engine 102 is connected to the generator 103, avoiding the field shaft alignment between the power output shaft of the gas turbine engine 102 and the input shaft of the generator 103, thus greatly reducing the precision and difficulty of field assembly and shortening the assembly time. The power control system 104 includes an electric power unit and a control system, the electric power unit is configured to output electric power from the generator 103, and the control system includes a gas turbine control unit and a control unit of the generator 103. A power control system 104 is integrated to reduce the workload of field cable connection, and extend the service life of electrical components at the same time.

Figure 4:
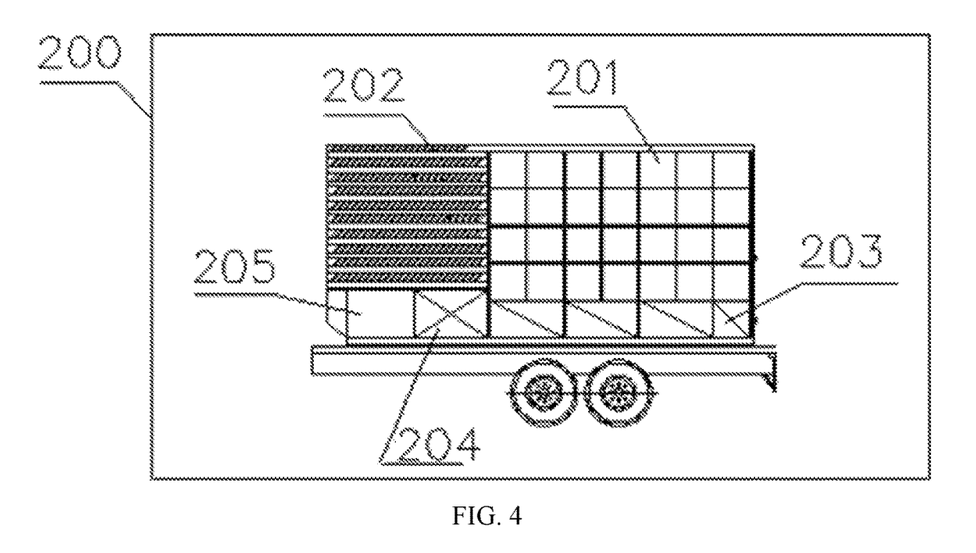
FIG. 4 is a schematic structural diagram of an intake ventilation transport vehicle.
Figure 5:
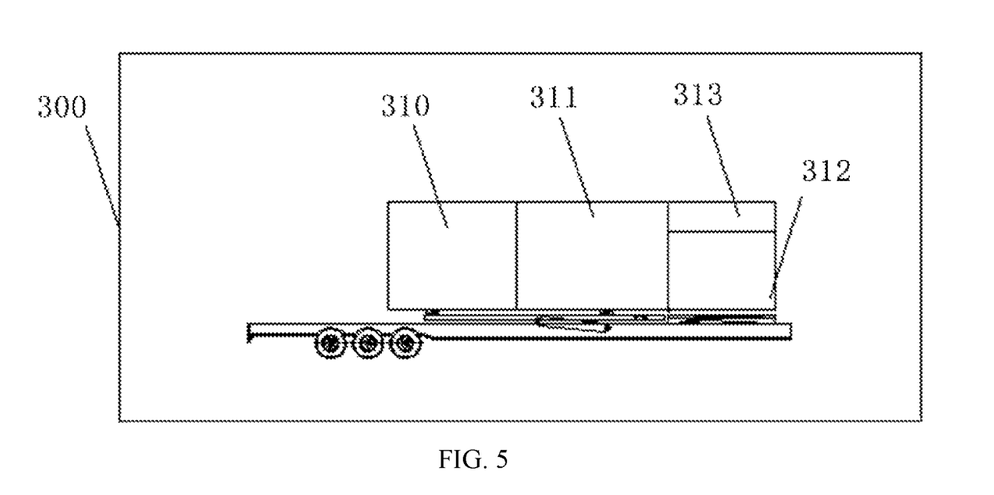
FIG. 5 is a schematic structural diagram of side connection of the exhaust transport vehicle in transport state.
Figure 6:
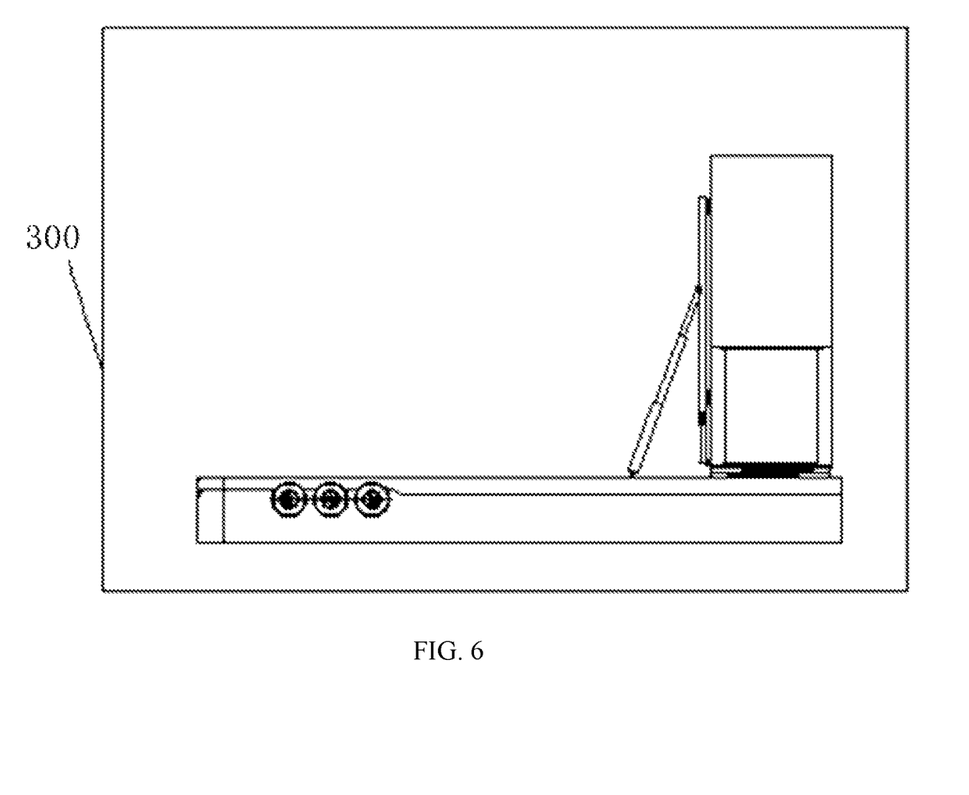
FIG. 6 is a schematic structural diagram of side connection of the exhaust transport vehicle in working state.

The intake ventilation transport vehicle 200 includes an air intake system, a cabin ventilation and cooling system and a second transport carrier, the air intake system and the cabin ventilation and cooling system are disposed on the second transport carrier, the air intake system is connected to an air intake port 101 of the gas turbine engine 102, and the air intake system, the gas turbine engine 102 and the generator 103 are arranged at the same axial direction, avoiding unnecessary elbows, with small intake pressure losses and a stable flow direction.

The air intake system includes an intake filter 201 and an intake silencer 202, providing clean air required for combustion in the gas turbine engine 102. The intake filter 201 cleans the air according to the precision required for the gas turbine engine 102; and the intake silencer 202 reduces the noise generated during the intake process to a level that meets local environmental requirements.

The cabin ventilation and cooling system is connected to the cabin disposed outside the gas turbine generation transport vehicle 100 through a flexible ventilating duct, providing clean air for cooling the gas turbine engine 102. The cabin ventilation and cooling system includes a ventilation filter 203, a ventilation silencer 204 and a ventilation fan 205.

The gas turbine generation transport vehicle 100 includes an auxiliary system, which services the gas turbine engine 102 and/or the generator 103. The auxiliary system includes a lubrication system, a fire fighting system and a fuel system, the lubrication system provides lubrication for the gas turbine engine 102 and the generator 103, the fire fighting system is used for fire protection of the gas turbine generation transport vehicle 100, and the fuel system provides fuels for the gas turbine engine 102. The lubrication system, the fire fighting system and the fuel system are integrated on the gas turbine generation transport vehicle 100 to reduce the number of transport vehicles.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A system for providing mobile power, comprising a gas turbine generation transport vehicle, an intake ventilation transport vehicle and an exhaust transport vehicle, the intake ventilation transport vehicle is connected in the travel direction of the gas turbine generation transport vehicle, and the exhaust transport vehicle is disposed at one side of the gas turbine generation transport vehicle; wherein
the exhaust transport vehicle comprises an exhaust system, the exhaust system is connected to the side or the top of the gas turbine generation transport vehicle; and
the system for providing mobile power further comprising a lifting mechanism, wherein when the exhaust system is connected to the side of the gas turbine generation transport vehicle, and a side docking of the exhaust system is achieved by the lifting mechanism disposed on the exhaust transport vehicle.

2. The system for providing mobile power according to claim 1, wherein the intake ventilation transport vehicle is transported separately as a whole, or powered by the gas turbine generation transport vehicle to be transported after being docked with the gas turbine generation transport vehicle.

3. The system for providing mobile power according to claim 1, wherein the gas turbine generation transport vehicle comprises a gas turbine engine, a generator, a power control system and a first transport carrier, the gas turbine engine, the generator and the power control system are integrated on the first transport carrier, and the gas turbine engine is connected to the generator.

4. The system for providing mobile power according to claim 3, wherein the power control system comprises an electric power unit and a control system, the electric power unit is configured to output electric power from the generator, and the control system comprises a gas turbine control unit and a generator control unit.

5. The system for providing mobile power according to claim 3, wherein the intake ventilation transport vehicle comprises an air intake system, a cabin ventilation and cooling system and a second transport carrier, the air intake system and the cabin ventilation and cooling system are disposed on the second transport carrier, the air intake system is connected to an air intake port of the gas turbine engine, and the air intake system, the gas turbine engine and the generator are arranged at the same axial direction.

6. The system for providing mobile power according to claim 5, wherein the cabin ventilation and cooling system provides clean air for cooling the gas turbine engine.

7. The system for providing mobile power according to claim 3, wherein the gas turbine generation transport vehicle comprises an auxiliary system which services the gas turbine engine and/or the generator.

8. A system for providing mobile power, comprising a gas turbine generation transport vehicle, an intake ventilation transport vehicle and an exhaust transport vehicle, the intake ventilation transport vehicle is connected in the travel direction of the gas turbine generation transport vehicle, and the exhaust transport vehicle is disposed at one side of the gas turbine generation transport vehicle, and
the exhaust transport vehicle comprises an exhaust system, the exhaust system is connected to the side or the top of the gas turbine generation transport vehicle; and
the system for providing mobile power further comprising a lifting mechanism, an up-down adjusting device, and a parallelogram mechanism, wherein when the exhaust system is connected to the top of the gas turbine generation transport vehicle, the top docking of the exhaust system is achieved by the combined action of the lifting mechanism, the up-down adjusting device and the parallelogram mechanism disposed on the exhaust transport vehicle.

9. The system for providing mobile power according to claim 8, wherein the exhaust system is placed horizontally in transport state, while in working state, it is lifted by a lifting mechanism from horizontal to vertical.

10. The system for providing mobile power according to claim 9, wherein the exhaust system comprises an exhaust silencer, an exhaust elbow, an exhaust reducer union and an exhaust expansion joint, the exhaust silencer is connected to the exhaust elbow, the exhaust elbow is hinged with the exhaust reducer union, and the exhaust reducer union is connected to the exhaust expansion joint; while in working state, the exhaust reducer union and the exhaust expansion joint can rotate to each other through a hinge, enabling the exhaust reducer union to be docked with the exhaust elbow.

11. The system for providing mobile power according to claim 8, wherein when the exhaust system is connected to the top of the gas turbine generation transport vehicle, the exhaust system is separably connected to the exhaust transport vehicle.

12. The system for providing mobile power according to claim 11, wherein when the exhaust system is connected to the top of the gas turbine generation transport vehicle, the exhaust system is separably connected to the exhaust transport vehicle by separation from the parallelogram mechanism.

13. The system for providing mobile power according to claim 12, wherein a locking mechanism is disposed between the exhaust system and the parallelogram mechanism, the exhaust system is separated from the parallelogram mechanism through the opening and closing of the locking mechanism.

14. The system for providing mobile power according to claim 8, wherein the up-down adjusting device comprises a first connecting plate, a first hydraulic cylinder and a second hydraulic cylinder, the first hydraulic cylinder is disposed between the first connecting plate and the lifting mechanism, the first hydraulic cylinder is used to adjust the first connecting plate up and down, one end of the second hydraulic cylinder is connected to the first connecting plate, the other end of the second hydraulic cylinder is connected to the parallelogram mechanism, and the horizontal displacement of the exhaust system is achieved by the expansion of the second hydraulic cylinder.

15. The system for providing mobile power according to claim 8, wherein the parallelogram mechanism comprises four supporting edges which are hinged end to end to form a parallelogram.

\* \* \* \* \*